United States Patent
Quintão Duarte Silva et al.

(10) Patent No.: US 11,124,719 B2
(45) Date of Patent: Sep. 21, 2021

(54) METHOD FOR INCREASING THE EFFICIENCY OF CONTINUOUS COMBUSTION SYSTEMS

(71) Applicant: UTIS—ULTIMATE TECHNOLOGY TO INDUSTRIAL SAVINGS, LDA, Porto Salvo (PT)

(72) Inventors: Francisco Diogo Quintão Duarte Silva, Cacém (PT); Paulo Eduardo De Meneses Moutinho E Henriques Goncalo, Cacém (PT); João Carlos Moura Bordado, Lisbon (PT)

(73) Assignee: UTIS—ULTIMATE TECHNOLOGY TO INDUSTRIAL SAVINGS, LDA, Porto Salva (PT)

( * ) Notice: Subject to any disclaimer, the term of this patent is extended or adjusted under 35 U.S.C. 154(b) by 106 days.

(21) Appl. No.: 16/483,597

(22) PCT Filed: Feb. 7, 2017

(86) PCT No.: PCT/IB2017/050652
§ 371 (c)(1),
(2) Date: Aug. 5, 2019

(87) PCT Pub. No.: WO2018/142191
PCT Pub. Date: Aug. 9, 2018

(65) Prior Publication Data
US 2020/0032152 A1 Jan. 30, 2020

(30) Foreign Application Priority Data
Feb. 3, 2017 (PT) .......................... 109894

(51) Int. Cl.
*C10K 3/06* (2006.01)
*F02B 43/10* (2006.01)
*F02M 21/02* (2006.01)
*F23N 5/00* (2006.01)

(52) U.S. Cl.
CPC ................ *C10K 3/06* (2013.01); *F02B 43/10* (2013.01); *F02M 21/0206* (2013.01); *F23N 5/00* (2013.01); *F23C 2900/9901* (2013.01); *F23K 2900/05004* (2013.01)

(58) Field of Classification Search
CPC .............. C10K 3/06; F02B 43/10; F23N 5/00
USPC .............................................................. 431/2
See application file for complete search history.

(56) References Cited

U.S. PATENT DOCUMENTS

| | | | | |
|---|---|---|---|---|
| 3,692,459 A | * | 9/1972 | Erb | ...................... F01K 25/005 431/11 |
| 2007/0227118 A1 | * | 10/2007 | Hu | ........................... F23C 9/08 60/39.182 |
| 2007/0264543 A1 | * | 11/2007 | Kim | ........................ C01B 3/384 429/412 |
| 2014/0290264 A1 | * | 10/2014 | Hovel | ..................... F01K 23/10 60/772 |
| 2015/0040844 A1 | | 2/2015 | Goldman et al. | |

FOREIGN PATENT DOCUMENTS

| | | |
|---|---|---|
| JP | 071190371 A | 7/1995 |
| WO | 2016064289 A1 | 4/2016 |

OTHER PUBLICATIONS

Falahat A. M., Engine Performane Powered by a Mixture of Hydrogen and Oxygen Fuel Obrained from Water Electrolys, International Journal of Automotive Technology, vol. 15(1), 2015, pp. 97-101.

* cited by examiner

*Primary Examiner* — Avinash A Savani
(74) *Attorney, Agent, or Firm* — Mark M. Friedman

(57) ABSTRACT

The present invention relates to a method of optimization for continuous combustion systems, which reduces fuel consumption, exhaust emissions and particulate matter. The operating principle is based on the introduction of small amounts of hydrogen in the fuel intake duct of the system, or preferably along the continuous burning chamber, with the aim of optimizing the burning of traditional fuels, improving the parameters of the combustion reaction, the effect of the process in question will increase the temperature of the walls of the chamber, ensuring re-ignition and a more complete combustion and consequently reducing the required fuel flow feed. This optimized combustion will increase the combustion efficiency and reduce its environmental impact.

11 Claims, No Drawings

METHOD FOR INCREASING THE EFFICIENCY OF CONTINUOUS COMBUSTION SYSTEMS

FRAMEWORK OF THE INVENTION

The present invention is related with the combustion processes of continuous burning, whether held in engines, chambers or even conventional industrial furnaces.

It should be noted that the combustion process involves a set of reactions of radicalar mechanism, i.e. with propagating species known as free radicals, which occur simultaneously and in general the combustion will be most complete the higher is the average content of present free radicals. It is well known that the gaseous fuels or the ones with easy vaporization burn easily, with moderate stoichiometric excesses of air, but for solid fuels, even if previously grinded, it's necessary to operate with bigger excesses of air.

The hydrogen combustion in $O_2$ occurs very quickly, in a very self-accelerated and highly exothermic process which turns macroscopically into an explosion, the same occurring in air (about 21% $O_2$). The propagation wave speed of the hydrogen explosions is much higher than the explosion of common fuels, inducing the formation of high radical concentrations, assuring a more complete combustion of the other fuels present.

This more complete combustion is evidenced by the reduction of the levels of hydrocarbons in the gaseous effluent, as well as the reduction of the levels of carbon monoxide. NO2 levels are variable and depend more of a number of factors such as the nature of the fuel used, the geometry of the furnace, and in particular the presence of "hot spots" resulting from preferential ventilation.

Specifying the case of conventional furnaces, it is known that the mixture of raw materials, previously grinded, is fed, often in counter flow with the effluent gases from the furnace in a system that allows preheating of the furnace supply, but it also allows to significantly reduce the levels of some contaminants of gaseous effluent. In the tubular furnace coated internally with refractory layers, the average residence time of the gases is much lower than the average time of residence of the particulate matter.

In a thermal balance of the furnace we have to consider the endothermic processes, in particular the "carbon loss" and the latent heat of fusion of the "melt" stages, as well as the thermal losses of different nature, in particular in the areas with less thermal insulation of the multi-cyclones.

The present invention comes to introduce in the combustion process of continuous burning tiny amounts of hydrogen (or in the initially formed HHO mixture) in the area of solid fuel burning, bringing to the Technical State of the Art an unexpected technical effect of consistently reducing fuel consumption and emissions.

Technical State of the Invention

In the current technical state of the use of hydrogen in internal combustion engines optimization, we can highlight the patent application PCT/PT2015/000043, which refers to a method for increasing the efficiency of internal combustion engines, acting the hydrogen in this process not like fuel, but rather as a optimizer of the combustion parameters in the form of oxidizer fed in conjunction with the air to the engine.

We can also refer to the following documents, as the closest State of the art of the invention:

"Experimental and Numerical of the effects of hydrogen addition on the laminar structure of methane-nitrogen's jet in hot co-flow under MILD conditions", International Journal of Hydrogen Energy 38, 13802-13811 (2013), A. Sepman. et al.—discloses a combustion in MILD conditions that is in laminar flow conditions with dilution of oxygen. It is referred in the document that in these "MILD" conditions "MILD" we can get a combustion without flame, which in English terminology is called "flameless combustion" and in Portuguese will be to designate "sem chama" or simply incandescent. The present invention differs from this document, once operates in conditions drastically different, with conventional excess of air and conventional continuous furnaces burners, as for example cement production furnaces. Also, as in what concerns the used conditions of hydrogen levels are drastically different, since either on the trial part of the document, either in the page 13804, it is shown that hydrogen is being used as a fuel, and in conditions in which it is possible to consider the stoichiometry (e.g. the reaction R3 explained in that referred page). In the present invention, hydrogen contents are tens of times lower and so the results are unexpected and can only be explained by a faster spread of flame;

GB 2089964 A—divulges a combustion process that uses a burner with continuous or pulsed injection with plasma formation in the combustion chamber, thus differing from the present invention which uses a conventional burner, to cause a conventional flame and separately, along the oven furnace, the introduction of hydrogen is made in trace amounts (far from stoichiometry);

The present invention differs from the statement of State of the art since the introduction of small amounts of hydrogen in the area of continuous burning of the solid fuel, which will increase the efficiency of the continuous combustion allowing reducing its environmental impact. Hydrogen is produced through an electrolysis reaction in an electrochemical cell.

DETAILED DESCRIPTION OF THE INVENTION

The process to increase the efficiency of continuous combustion objective of the present invention is non-stoichiometric, and occurs preferably in continuous furnace. In this process, the hydrogen is used as an agent of re-ignition to promote a more complete combustion of the fuel, and the hydrogen is introduced in the air feeding of the continuous burning chamber at various possible points, judiciously chosen at the combustion furnace, especially at points where there is occurrence of pneumatic transport of particles only incandescent.

To accomplish the objective of the present invention it will be necessary to define the following characteristics:
  points/entries where hydrogen must be introduced in the chamber where the burning occurs;
  how is introduced the hydrogen: pressure and frequency;
  range of hydrogen proportions.

The location of hydrogen entries can be made in various places, either in air fuel transporting on its simplest form, or preferably in points where the temperature profile in quasi stationary state, will allow immediate auto-inflammation of the hydrogen to prevent the accumulation. This temperatures profile can be determined by optical pyrometers, or by measuring the temperature of the outer surface of the furnace alongside its length, and derived by calculation which the conductivity and radiation dissipation values.

Preferably, the hydrogen entry points are located along the length of the reactor at distances greater than the internal radius of the body of the furnace (r), but less than its half-length. Still another preferred form, the hydrogen entry points are located along the length of the reactor at distances to the inside of the body of the furnace (r) between 2r and 16r and between 2r and 6r.

The straight section of the furnace is elliptical, square, rectangular or trapezoidal and the hydrogen entry points are located along the length of the reactor at distances greater than the hydraulic radius, defined in the usual manner for calculation of the Reynolds number and the subsequent determination of the coefficient of friction.

The Reynolds number is a dimensionless parameter that is of particular importance in fluid mechanics being calculated by the following formula:

$$Re = u \cdot ro \; d/miu, \text{ where:}$$

U—is the average velocity of the fluid;
Ro—is the density of the fluid;
d—is a linear characteristic parameter;
Miu—is the average viscosity of the fluid.

The hydrogen introduction can be done continuously in the chosen injection points, or discontinuously, in order to reduce the necessary amount of hydrogen, being similar the final result. This discontinuous form can be held in a pulsed form. Thus, the admission is made preferably discontinuous at one or more points through pipes equipped with a non-return valve, as well as system of measurement of doses and interruption. This hydrogen introduction has to be done always with pressures greater than the maximum pressure existing inside the combustion chamber.

We should clarify that in the case of the pulsed supply, the period between injection pulses is less than the average time of residence of the solid material in the furnace, but higher than the time of hydrogen deflagration spreading until it reaches the far end of the furnace and thus lack of simultaneity to prevent resonant harmonics.

The operating conditions in terms of the gas flux in the furnace, correspond to a Reynolds number exceeding 1,000, but less than $10^8$, and the hydrogen entry points are located along the length of the reactor at distances greater than the hydraulic radius defined in the usual way, but always the distances between them above the hydraulic radius defined in the usual way, for the calculating of the Reynolds number and subsequent determination of the coefficient of friction. Preferably, the operating conditions in terms of the gas flux in the furnace correspond to a Reynolds number between 10,000 and $10^7$, i.e. always in conditions of turbulent motion, and hydrogen entry points are located along the length of the reactor at distances greater than the hydraulic radius determined as usual, to compute the Reynolds number and the subsequent determination of the coefficient of friction.

The amount of hydrogen to introduce in the combustion process is, comparing to the main fuel, between 0.0001% and 1%, preferably between 0.001 and 0.1% (v/V) of the total volume of gases. Note that the controlling of the hydrogen introduction is made in a cascading way, depending on the contents of volatile organic compounds and carbon monoxide, measured continuously in the effluent gas mixture from the furnace, to ensure so much as possible a complete combustion.

Tests Performed Based on the Invention

Preliminary tests conducted on a pilot furnace allowed maintaining a temperature profile very similar to the usual, with fuel supply average reductions of 5% using HHO mixture injected into the secondary airflow. The most complete combustion of Residual Coal of Petroleum is evidenced by the significant reduction of emissions of VOCS (Volatile Organic Components) as well as the reduction of carbon monoxide content.

For carrying out of the trials it was used a tubular laboratory oven, with a diameter of 5 cm and 80 cm of length, equipped with a conventional burner "air less" (secondary air only) and working with Thin Fuel Oil (TFO) was stabilized at a temperature of 1,100° C., having the excess of secondary air been regulated by minimization of the opacimeter output signal. After stabilization measures were made of the total Volatile Organic Compounds (VOC's) in the effluent gases, as well as the recording of the value read on the opacimeter (e.g. VOCS 720 ppm; OPACIMETER 4.3 UVO). All tests were performed under stabilized conditions of burning and oven temperature, having been made five repetitions in each test, to allow reproducibility evaluation, having been recorded in the following table the observed averages variations.

At the inspection holes, spaced 10 cm were connected metal pipes of 1 mm diameter with a non-return valve, in order to allow the introduction gas mixture flows containing hydrogen produced by electrolysis.

TEST 1 (Blank)—in this test have been measured the concentrations of Nitrogen Oxides (NOx), total Volatile Organic Compounds (VOC's) and Carbon Monoxide (CO) in the gaseous effluent of the furnace, with careful to only register the values after checking of that the conditions were stabilized, i.e. is after the startup transient. In this blank was not made any introduction of hydrogen.

TEST 2—test carried out under the same conditions of the test 1, but with continuous introduction of H2 content corresponding to 0.01% (V/V) of the gas flow.

TEST 3—test carried out in identical conditions of test 1, with a total gas flow of H2 identical to the test 2, but with the introduction of H2 of pulsed form, with a frequency of 1 second, this is 1 second of injection followed by 1 second of interruption and so on, using a rotary valve identical to the ones used in injection of preparative chromatography.

TEST 4—test at all analogous to test 2 but with a content of Hydrogen injected of 0.001% (V/V) i.e. ten times lower.

TEST 5—in all similar to test 3, but with a total content of nitrogen of 0.001% (V/V) to allow compare directly with the test 4.

TABLE 1

Tests Results

| Test Nr. | % H2 (V/V) at Total Gas Flow | Continuous (C) or Pulsated (P) | Observed Variations Observed over time (average of 5 determinations) | | |
|---|---|---|---|---|---|
| | | | NOx | COV'S | CO |
| 1 | — | — | ±4% | ±8% | ±6% |
| 2 | 0.01% | C | −14% | −74% | −52% |
| 3 | 0.01% | P | −8% | −79% | −67% |
| 4 | 0.001% | C | −21% | −63% | −44% |
| 5 | 0.001% | P | −13% | −66% | −48% |

The obtained results seem to indicate a better efficiency in the reduction of VOC's and CO with a pulsed injection of hydrogen, but on the contrary a more significant reduction of NOx reduction in the continuous introduction of hydrogen.

It should be noted that all quantities of H2 introduced are vestigial and they are very far from the stoichiometric combustion conditions. Changes in pollutant levels observed are so surprising, and very difficult to explain.

All of that found in the literature concerning the introduction of H2 in burning systems, uses H2 levels much higher, hundreds of times, and it is not reasonable to make analogies, or in terms of mechanisms consider the applicability once combustion reactions in gas phase have the limiting kinetic step of second-order by which the speed varies with the square of the concentration. It's so surprising that the tiny amounts of hydrogen used can spark re-ignition making more complete the combustion of the primary fuel.

The volumes recorded in half an hour of operation have been corrected with tabulated values of solubility in water, admitted in saturation conditions in the measuring beaker.

The use of rotary valve which allows for the introduction of H2 in a pulsed form induces an increase of pressure on the rubber tube, and consequently within the electrolytic cell. So, the tests of flow check in the system of inverted test tube in water tank were repeated. It was found that the small observed difference (less than 1%) will be within the experienced error of the used method, and thus should be concluded that the small difference in pressure induced by the valve does not have significant influence on the average current gas flow with H2.

In the used laboratory installation it is not easy to quantify the reduction of fuel consumption. However, in the 25 tests (1 to 5 with 5 repetitions) has always been necessary to act on the valve of needle of the burner to reduce the fuel flow in order to maintain the same average temperature of the oven. This reduction was done iteratively always since the speed of response of average temperature is not immediate being necessary to wait at least 3 minutes to ensure stabilization.

In trials conducted with much lower levels of H2 (0.0001% and 0.00001%) the oven temperature variation was not observed and thus it should be assumed that the effect on combustion efficiency is no longer observable in these cases with the measuring equipment installed.

The invention claimed is:

1. Method for increasing the efficiency of continuous combustion systems characterized by being non-stoichiometric and by:
   a. Introduction of a quantity of hydrogen, in relation to the main fuel, between 0.0001% and of the total volume of gases;
   b. The control of the introduction of hydrogen is made in cascading and function of the contents of volatile organic compounds and carbon monoxide, measured continuously in the effluent gas mixture;
wherein the method occurs in a continuous furnace.

2. Method according to claim 1, characterized by the amount of hydrogen to introduce is between 0.001 and 0.1% (v/V) of the total volume of gases.

3. Method according to claim 1 characterized by the hydrogen entry points in continuous firing chamber are:
   a. in the air fuel transport; or
   b. in which the temperature profile in quasi stationary state, auto ignite the hydrogen; or
   c. points where there is occurrence of pneumatic transport of particles only incandescent.

4. Method according to claim 1 where admission of hydrogen can be made discontinuously, in one or more entry points from the continuous burning chamber, by means of pipes fitted with non-return valve, as well as a system of controlled supply and interruption, at pressures greater than the maximum pressure inside the combustion chamber.

5. Method according to claim 1 characterized by the temperature profile is determined by optical pyrometers, or by measuring the temperature of the outer surface of the furnace alongside of the respective length, and derived by calculation including the conductivity and radiation dissipation.

6. Method according to claim 1 characterized by the entry points of hydrogen are located along the length of the reactor at distances greater than the radius of the body of the furnace (r), but less than half of its length.

7. Method according to claim 1 characterized by the entry points of hydrogen are located along the length of the reactor at distances to inside radius of the furnace body (r) between 2r and 16r and between 2r and 6r.

8. Method according to claim 1 characterized by the straight section of the furnace being elliptical, square, rectangular or trapezoidal and hydrogen entry points are located along the length of the reactor at distances greater than the hydraulic radius, for calculating Reynolds number and subsequent determination of the coefficient of friction.

9. Method according to claim 1 characterized by the introduction of hydrogen is pulsed with a period between hydrogen injection pulses below the average time of residence of the solid material in the furnace, but higher than the time of hydrogen deflagration spread until it reaches the far end of the furnace.

10. Method according to claim 1 characterized by the operating conditions in terms of gas flow in the furnace, correspond to a Reynolds number exceeds 1,000, but less than $10^8$, and the hydrogen entry points are located along the length of the reactor at distances greater than the hydraulic radius, but always at distances from each other above this hydraulic radius, for calculating Reynolds number and subsequent determination of the coefficient of friction.

11. Method according to claim 1 characterized by the operating conditions in terms of gas flow in the furnace correspond to a Reynolds number between 10,000 and $10^7$, and the hydrogen entry points are located along the length of the reactor at distances greater than the hydraulic radius, for calculating Reynolds number and subsequent determination of the coefficient of friction.

* * * * *